United States Patent

[11] 3,619,205

[72] Inventors Daniel J. LeVan
 Nanuet;
 Barry E. Homler, Ossining; Peter M. Bosco, Yonkers, all of N.Y.
[21] Appl. No. 777,486
[22] Filed Nov. 20, 1968
[45] Patented Nov. 9, 1971
[73] Assignee General Foods Corporation
 White Plains, N.Y.

[54] PROCESS OF PREPARING A SLUSH ICE BEVERAGE CONCENTRATE
 3 Claims, No Drawings
[52] U.S. Cl. .................................................... 99/78,
 62/1, 99/28, 99/136
[51] Int. Cl. ....................................................... A23l 1/00,
 A23g 5/00
[50] Field of Search ............................................ 99/28, 78,
 79, 136, 54, 141, 137, 192; 62/1, 69

[56] References Cited
 UNITED STATES PATENTS
 2,168,934 8/1939 Haskins et al ................ 99/136
 2,507,482 5/1950 Scott ............................ 99/28
 2,863,776 12/1958 Lisher .......................... 99/136
 3,123,478 3/1964 Powell ......................... 99/136 X
 OTHER REFERENCES
 Jacobs, Carbonated Beverages. 1959, page 70

Primary Examiner—Morris O. Wolk
Assistant Examiner—Stephen B. Davis
Attorneys—Thomas V. Sullivan, Bruno P. Struzzi and Jerome J. Norris ABSTRACT: Sucrose, flavor, a water dispersible gum, an edible polyhydric alcohol, an edible food acid and water are mixed and then frozen. The frozen mixture is ground and blended with a quantity of flaked ice. The blend is refrozen forming a spoonable frozen concentrate which is added to an equal portion of cold water, carbonated water, or milk to form a slush ice beverage.

PROCESS OF PREPARING A SLUSH ICE BEVERAGE CONCENTRATE

SUMMARY

This invention relates to preparing beverage products which are served as a spoonable or drinkable slush ice composition.

The invention further relates to dilutable partially frozen concentrates, composed of distinct ice crystals surrounded by a matrix of flavor and certain soluble solid blends.

In recent years commercial vending machine equipment has been developed to produce noncarbonated slush ice beverages for consumption at the dispensing premises. The popularity and wide acceptance of these drinks, which are particularly refreshing in summer climates, are in large measure due to the presence of ice crystals. However, these slush beverages require manufacturing the ice separately, and adding the flavored syrup afterwards.

Heretofore, no home use ice slush beverage, in which nonagglomerating ice particles were formed at home was available, and the slush had to be consumed at the distributing premises soon after purchase, or the ice particles would melt.

Other compositions presently on the market include so-called "icy" products which are not designed for home use nor capable of subsequent dilution.

Of further importance however, is the fact that flavored "icy" compositions presently on the market have a tendency to form solid blocks of ice from which the flavor, sugar and other ingredients separate upon freezing.

One object of this invention is to provide a partially frozen concentrate which is of such formulation that it will not solidify into single or multiple large blocks of ice when stored at 0° F. freezer temperatures.

Another object is to provide partially frozen concentrates, for subsequent dilution, composed of distinct ice crystals surrounded by a matrix of flavor and certain soluble solid blends.

A further object is to provide a system having a consistency which, when balanced with soluble solids, in combination with distinct ice crystals, provide a stable spoonable frozen matrix-flaked ice concentrate at normal freezer temperatures.

Other objects and advantages of the invention will become apparent from the following descriptions.

It is a feature of this invention that when certain soluble solids are admixed with comminuted ice, a concentrate having a partially frozen consistency is imparted upon refrigeration. When this concentrate is diluted with water, carbonated water, or milk, a good tasting slush beverage is produced.

It is known that 1 gram molecular weight (mole) of solute dissolved in 1,000 grams of water will reduce the freezing point of that solution 1.86° C., the effect of several moles of the same or different solutes in the same solution is known to be additive.

It could not be expected however, that certain ranges of soluble solids or solutes, in combination with flaked ice would produce partial freezing at 0° F. to provide partially frozen concentrate which is spoonable and capable of dilution to form a slush ice beverage.

In fact, upon refrigerating a soluble solid containing solution in combination with flaked ice at 0° F., the expected phenomena would be a lowering of the freezing point; however, not in such a way as to prevent a frozen solid block of the flaked ice concentrate.

The objects of this invention are accomplished by mixing a frozen ground homogenous blend of (A) about one part of a mixture of sucrose syrup, flavor, an edible food acid, a water dispersible gum, an edible polyhydric alcohol, and water, with (B) about 0.25 parts of flaked ice, having particle sizes ranging from 250 to 2,000 microns, and refrigerating the mixture at −10° F.

The edible polyhydric alcohols which may be employed in the novel concentrate for slush ice beverages include, propylene glycol, glycerol, sorbitol, and combinations thereof, as well as other well known edible polyhydric alcohols.

Includable in the edible food acids utilizable in this invention are citric, malic, tartaric, fumaric, gluconic, latic, phosphoric, and other well known food acids.

Among the various water dispersible gums and colloids which may be utilized in the novel slush ice beverage concentrate of this invention are gum tragacanth, gum karaya, gum arabic, locust bean gum, guar seed gum, carrageenan, pectin, sodium carboxymethylcellulose, alginates, gelatin, gum ghatti, agar, and the like.

Various flavors utilizable in this invention include raspberry, cherry, blackberry, strawberry, lemon, lime, orange, peach, grape, banana, apple, pineapple, ginger, chocolate, vanilla, cola, tea and coffee, and the like, as well as combinations thereof.

Following are examples which set forth the preferred embodiment of the invention:

EXAMPLE I

| Ingredients | | Range of Ingredients |
|---|---|---|
| Sucrose Syrup | 27.4 | 20–35 |
| Orange Flavor | 0.3 | 0.1–0.5 |
| Cloud* | 0.1 | 0.1–0.2 |
| Citric Acid (Anhydrous) | 0.9 | 0.3–1.3 |
| Carboxymethylcellulose | 0.8 | 0.5–1.0 |
| Glycerol | 2.0 | 1.0–3.0 |
| Water | 48.5 | 45–55 |
| Flaked Ice | 20.0 | 20–40 |

*Cloud –optional ingredient used to impart an opaqueness to the ultimate slush ice beverage. It contains:

| | |
|---|---|
| Brominated Vegetable Oil / Vegetable Oil | 20% |
| Gum Arabic | 79% |
| Dioctyl Sodium Sulfosuccinate | 1% |

Carboxymethylcellulose and glycerol were thoroughly mixed. Next, syrup, orange flavor and cloud were added to a mixing vessel and mixed briefly with a nomomixer to form a blend. The carboxymethylcellulose/glycerol mixture is then added to the blend in the mixing vessel, and blended in the homomixer for 15–20 minutes. Citric acid is added and the mixture blended for 5 minutes. Water is added in sufficient quantity to dilute the matrix to a range between 20% to 36% solids. The mixture is poured into containers and refrigerated at −10° F. The frozen product is removed from containers, ground through a 5/16 inches die, then blended with 20% by weight of flaked ice, having particle sizes ranging from 250 to 2,000 microns. The blended product is then packed and refrozen at −10° F. to provide a semisolid mass which is spoonable.

A glass is one-third or one-half filled with cold water, and an equal portion of partially frozen flavored matrix covered ice is spooned into the glass and stirred to produce a good tasting slush orange beverage, having uniformly sized nonagglomerating flaked ice crystals.

Milk is added in equal portions to a second sample of the spoonable concentrate to produce a frostier, creamier slush ice beverage.

EXAMPLE II

Same as example I using lime flavor, and adding carbonated water to the frozen matrix cover ice.

Example III

Same as example I employing lemon flavor or concentrated lemonade.

Example IV

Same as example I employing cola flavoring, and phosphoric acid in lieu of citric.

EXAMPLE V

Same as example I employing grape flavoring, and tartaric acid in lieu of citric acid.

EXAMPLE VI

Same as example I employing tea concentrate as the flavor

EXAMPLE VII

Same as example I employing coffee concentrate as the flavor, and eliminating citric acid.

EXAMPLE VIII

Same as example I employing chocolate flavor, and eliminating citric acid.

It should be noted that when nonfrozen flavored matrix is added directly to the flaked ice and refrigerated at −10° F., the produce obtained is nonspoonable when employing ordinary manual pressure. Thus, it is essential to refrigerate the flavored matrix to obtain a frozen flavored ground matrix before adding the same to flaked ice.

It is understood that any desired flavoring substance may be added to the novel formulation of this invention in amounts sufficient to provide intensity of flavoring. It is further understood that carbonated water may be employed in lieu of noncarbonated water to dilute the concentrate.

Having described in detail preferred embodiments of the invention, and the manner of practicing the same, it is to be understood by those skilled in the art to which the invention pertains, that many changes, embodiments and applications will suggest themselves without departing from the scope of the invention. Accordingly, the disclosure and description herein are merely illustrative and not intended to be limiting in any sense.

What is claimed is.

1. A process of preparing a frozen spoonable concentrate suitable for preparing slush ice beverages comprising: (A) freezing a matrix of sucrose, flavor, a water dispersible gum, an edible polyhydric alcohol, an edible food acid and water; (B) grinding said frozen matrix; (C) blending about one part of said ground frozen matrix with about 0.25 parts of flaked ice; and refreezing the blend.

2. The process according to claim 1 wherein the flaked ice has particle sized ranging from 250 to 2,000 microns.

3. The process according to claim 1 wherein the matrix contains between 20% to 36% solids.

* * * * *